Nov. 1, 1966  G. W. ROEHRS  3,283,112
INDUCTION BUTT WELDING

Filed July 13, 1965  2 Sheets-Sheet 1

INVENTOR.
Guenter W. Roehrs
BY
Robert E. Fowler
ATTORNEY

INVENTOR.
Guenter W. Roehrs
BY
Robert E. Fowler
ATTORNEY

United States Patent Office 3,283,112
Patented Nov. 1, 1966

3,283,112
INDUCTION BUTT WELDING
Guenter W. Roehrs, Rochester, Mich., assignor to General Motors Corporation, Detroit, Mich., a corporation of Delaware
Filed July 13, 1965, Ser. No. 471,517
4 Claims. (Cl. 219—9.5)

This invention relates to high frequency alternating current welding method and apparatus for forming butt welds of parts.

Three electrical principles are utilized in the proposed method to produce satisfactory welds with a minimum expenditure of energy and cost. These basic principles are:

(1) The skin effect

This effect is the tendency toward crowding of the current into the outer layer or "skin" of a conductor due to the self-inductance. It results in an increase in the resistance of the conductor.

(2) The proximity effect

The proximity effect is the distortion of the current distribution in one conductor caused by the induction between the current therein and that in an adjacent conductor in which the current flows in the opposite direction. This causes a concentration of the current in the parts of the conductors nearest each other thus increasing their effective resistance.

(3) The inductive effect

In any inductive device, such as a transformer, a reduction in the air gap through which the flux has to pass will increase the power transferred and decrease the loss.

It is an object in making this invention to provide welding means utilizing the maximum efficient use of power to perform the desired weld by having the loss decrease as the weld is formed.

It is a further object in making this invention to provide a method of welding parts together in which the adjacent surfaces are so formed as to concentrate the initial flow of current to relatively small areas and thus concentrate the heating to initiate the weld.

It is a further object in making this invention to provide welding apparatus which automatically shortens the magnetic path in the welding means as the weld progresses to increase the amount of power applicable to the weld per se.

It is a further object in making this invention to provide welding means which utilize the work parts to be welded as part of the secondary circuit of the transformer.

With these and other objects in view which will become apparent as the specification proceeds, my invention will be best understood by reference to the following specification and claims and the illustrations in the accompanying drawings, in which:

Figure 1:
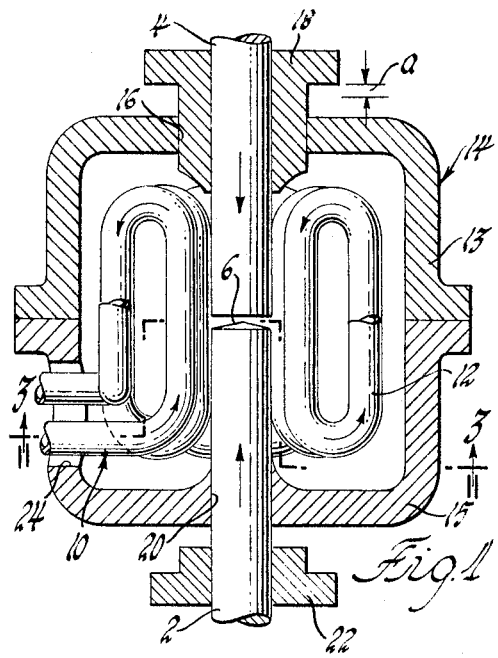
FIGURE 1 is a vertical section taken through a welder embodying the principles of my invention with the parts to be welded shown just prior to welding.
Figure 3:
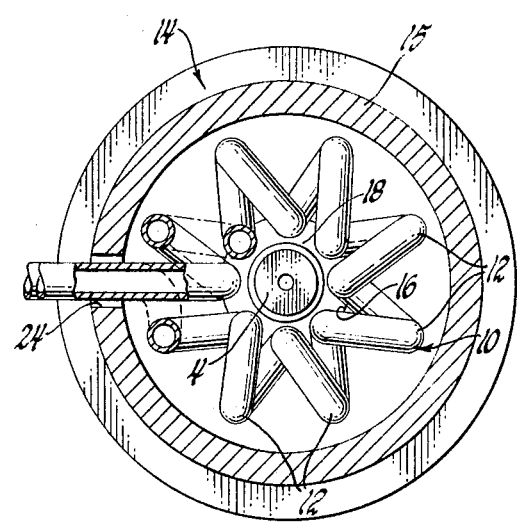
FIG. 3 is a sectional view taken on line 3—3 of FIG. 1 in the direction of the arrows.

When it is desired to weld two surfaces together, such as in butt welding, it is desirable to concentrate as much heat as possible directly in the surface areas to be welded and to keep from heating the remainder of the current conducting parts of the workpieces where the heat is merely a loss. If it is proposed to weld together the ends of two rods, such as 2 and 4, as shown in FIG. 1, if the two facing surfaces are squared and the rods pressed into contact and welding current applied to each either through conduction or induction, the current flowing through both rod 2 and rod 4 will flow longitudinally in a layer under the bar surface heating mainly this layer. The matching surfaces will stay cold in the center and weld only close to the circumference. It will be necessary, therefore, to apply a substantial amount of power before a satisfactory weld is obtained. However, if current can be concentrated at one point, such as to cause that point to heat, then less power will be necessary to start the weld which will then continue over the surface. It is, therefore, proposed to so shape the matching ends of the two rods that they will contact only at a point or over a very limited area.

This could be obtained by many different configurations and the particular shape is unimportant. However, to illustrate the principle, there is shown in FIG. 1 a pointed area 6 on rod 2 which makes central contact with the flat end of rod 4. Thus all the current that flows from rod 2 to rod 4 must concentrate in this small tip and at the point of contact on the opposite flat end of rod 4. This will cause welding at this point with the application of a relatively small amount of current. During the application of power to these two members leading up to the heating of the tip, current flows substantially radially along the tapered surface of the nose 6 and then spreading out again radially on the lower face of the flat surface of the rod 4. This current will flow practically on the surface since high frequency current is applied. This is due to the previously defined "skin" effect and the current flowing in the opposite face will also flow on the surface due to the same effect. This will raise the resistance in this portion and, therefore, tend to heat it more exactly at the point desired. There is likewise present the "proximity" effect previously defined herein, the current flowing from the outer periphery toward the point of the nose 6 would tend to flow as nearly as possible to the current flowing radially in the upper surface of the end of the rod 4. This likewise increases the resistance at the desired point and adds heating where desired. Therefore, upon the application of high frequency welding power to these two rods with the nose 6 in contact with the lower surface of the rod 4, it will first become joined which condition will spread throughout the area on the adjacent ends of both parts and then upon an application of axial pressure to the two rods they may be pressed together forming a satisfactory weld. This condition is indicated at 8 shown in FIG. 2. Because of the use of the described effects the amount of current and power used is a minimum for the particular size of the parts being welded.

In the embodiment shown in FIG. 1 the rods 2 and 4 to be welded form a portion of the one turn secondary winding of the power transformer. The primary is formed by a hollow tube 10 which is wound in annular convolutions 12 as a torus around a central area into which the rods 2 and 4 may be inserted. This tubing is hollow so that it may be water cooled and it is electrically conductive so that electrical power can be applied thereto, the power in this instance being high frequency alternating current. The outside casing 14 formed of two complementary halves 13 and 15, the upper half 13 having an opening 16 through which a chuck or a collet 18 holding the rod or workpiece 4 may be inserted for relative movement. In like manner the lower half 15 has a similar opening 20 through which the lower rod 2 is inserted and held by a similar clamp or collet 22. The primary coil connections enter through an opening 24 in the lower half 15 of the casing 14.

Figure 2:
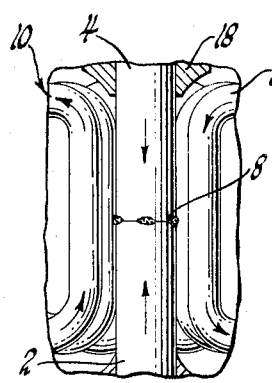
FIG. 2 is a partial view of the parts shown in FIG. 1 at the completion of the weld.

In operating the proposed device the workpieces 2 and 4 would be inserted in the collets 18 and 22 and forced into the opposite ends of the housing 14 until they were in contact. A certain amount of end pressure would then be applied either through the collets or through pressure on the rods themselves following which electrical power would be applied to the primary winding 10. This would induce current in the single turn secondary formed of the casing 14 together with the workpieces or rods 2 and 4 causing current flow through the workpieces and through the casing. Since this is high frequency current, the current would concentrate at the point of nose 6 and the action would be as previously described causing a joining condition to first be generated at the central contact point and expand radially until both surfaces were heated, then due to the axial pressure the two parts would gradually move together until they were united as shown in FIG. 2 and the rods had moved an approximate distance equal to $a$ in order to take up the initial length of the nose of rod 2.

Figure 4:
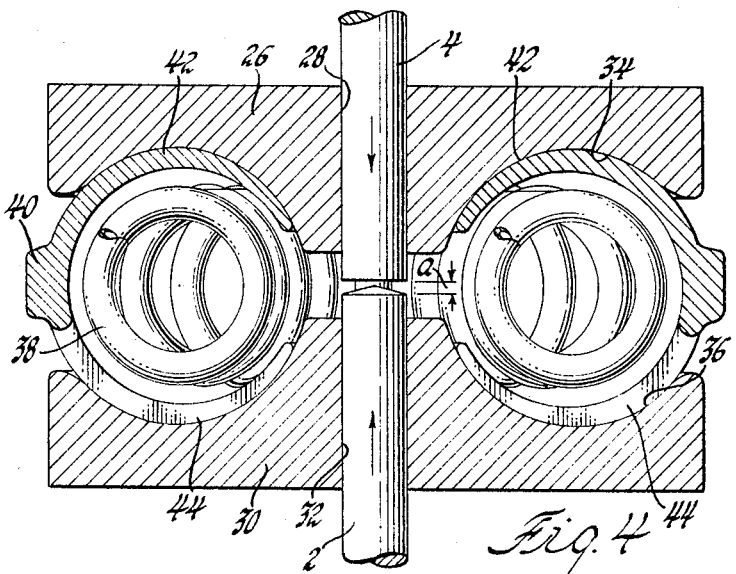
FIG. 4 is a vertical section through a modified form of welder embodying features of my invention with the parts to be welded shown prior to welding.
Figure 5:
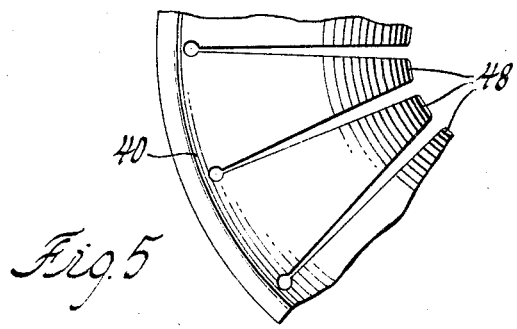
FIG. 5 is a partial plan view of the conductor shell used in the design of the welder of FIG. 4.

FIGS. 4 and 5 show modified forms of my invention. In this instance the two workpieces 2 and 4 of the same configuration are shown having the same configuration of adjacent faces for welding. In this instance there is shown an upper clamping member or housing half 26 having a central opening 28 in which the rod 4 is inserted. It is assumed that this fit is a tight fit such as to apply sufficient endwise force to the rod 4 when pressed downwardly in order to provide the weld. There is also a lower clamping member 30 which holds the lower workpiece or rod 2 in the same manner. Again the fit between the rod 2 and the opening 32 is a relatively tight fit so that axial pressure may be applied. Both these members have matching annular grooves 34 and 36 for housing the primary winding 38 which is in the form of a cylindrical torus. Surrounding the primary winding 38 is a conductor 40 having a toroidal shape with curved upper resilient walls 42 and similar curved lower resilient walls 44. The configuration of both walls 42 and 44 are shown in FIG. 5 having fingers 48 with slots of increasing width extending inwardly. Thus as the members 42 and 44 are forced toward the primary winding the fingers are moved toward each other in either case to decrease the reluctance of the magnetic circuit and increase the power as the rods 2 and 4 approach each other.

In this instance, therefore, the operation would be that workpieces 2 and 4 would be inserted into clamps 26 and 30 and the two forced inwardly until they were in contact. Then electrical power would be applied to the primary winding 38 and as before the matching surfaces of the rods 2 and 4 would initially weld at the peak of the nose 6 and then spread across the surface. A constant pressure applied either to the clamping members 26–30 or to the rods held thereby would cause them to come into juxtaposition as the nose 6 became progressively welded to and becomes a part of the matching surface. This relative movement of the two parts would cause the clamping members 26 and 30 to approach each other by the distance $a$ and due to the surfaces of the toroidal cavities would force the fingers 48 toward the primary winding to decrease the air gaps and increase the amount of power transferred and provide additional power input as the surfaces contact or the rod areas became greater to produce a better weld.

Figure 6:
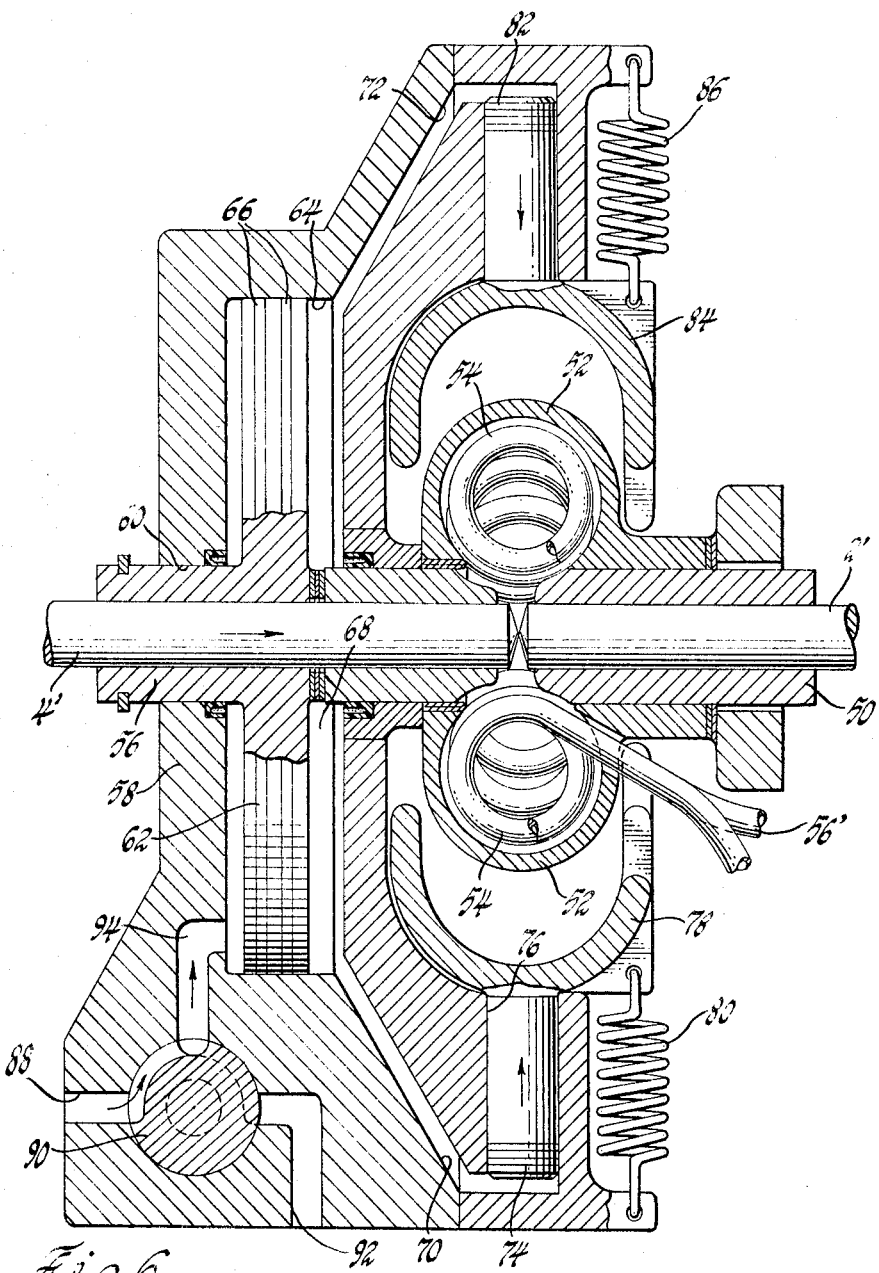
FIG. 6 is a vertical section through a further modified form of a welding device embodying my invention showing operating means for the component parts.

The modification shown in FIG. 6 illustrates some type of operating means for the various parts. In this instance the welding machine is shown as a horizontal welding machine instead of vertical. The workpieces 2' and 4' are both shown having conical matching faces so that the distance between the two is somewhat greater than in the previous examples. The workpiece 2' is supported in a clamp or holding sleeve 50 which is rigidly held in the device. Also mounted on the outside of the sleeve 50 is an annular housing 52 in which is supported a cylindrical toroidal primary 54 having leads 56' which extend to the electrical power source. On the opposite side and in alignment with the workpiece 2' the workpiece or rod 4' is supported in a movable sleeve 56 slidably mounted in the frame 58 through opening 60. Sleeve 56 carries as an integral part an operating piston 62 which fits within a cylinder 64 in the interior of the casing. Piston 62 has a series of sealing rings 66 in its periphery. A chamber 68 formed on the inner side of the piston 62 is connected through a channel 70 to one end of the housing and also through a second channel 72 to a chamber in the opposite end. A smaller piston 74 is chambered in a cylindrical bore 76 in the lower portion of the housing, its inner face connecting with the chamber at the end of duct 70. This piston 74 carries a roughly U-shaped magnetic member 78 adapted to fit around the single turn secondary housing 52 and can be moved with respect thereto to change the effective magnetic properties thereof for increasing or decreasing the loss. This U-shaped magnetic member 78 is spring biased by spring 80 away from the secondary winding but can be forced into a position over the same by pressure behind the piston 74.

The same construction is utilized at the top where piston 82 carries U-shaped magnetic member 84 which is spring biased by spring 86. Member 84 may come down over the upper portion of the secondary winding 52 and encompass that. The frame 58 is also provided with a pressurized fluid inlet duct 88 which leads into a control valve 90 also connected with an exhaust port 92 and an operating duct 94 extending to one side of the piston 66. In the operation of this device the workpieces 2' and 4' are inserted and pressed together until they contact. When the welding current is applied to leads 56, fluid under pressure is likewise applied through simultaneous operation of the valve 90 to the outer face of piston 66. This pre-loads the rod 4' pushing it against the rod 2' which is held. As the interfaces weld and approach each other the piston 62 will force the pistons 74 and 82 inwardly through the closed hydraulic system causing the shrouding members 78 and 84 to come down over the secondary winding and encompass it to decrease the power loss and increase the demand in power to maintain adequate heat to provide a satisfactory weld.

From the above it will be evident that by the use of my apparatus and method I have provided a welding apparatus and means which utilizes a minimum of power, so controlled as to increase under a programmed effect to produce efficient and adequate welds.

What is claimed is:

1. In welding apparatus for joining a plurality of parts together, a plurality of spaced relatively movable means biased toward one another for supporting parts to be welded in alignment and to hold them in juxtaposition during welding and bias the adjacent surfaces together, said movable means being provided with complementary cavities forming a housing around the adjacent ends of the parts to be welded, a primary winding supported within said housing, the relatively movable means together with the parts to be welded forming a secondary winding, and biasing force means to apply pressure to force the parts toward each other and decrease the size of the housing as the weld progresses.

2. In welding apparatus for joining a plurality of parts, a plurality of spaced relatively movable means biased toward one another for supporting parts to be welded in alignment and to hold them in juxtaposition during welding and bias the adjacent faces together, said movable means being provided with complementary cavities forming a housing around the adjacent ends of the parts to be welded, a transformer including, a primary winding supported within said housing, the relatively movable means together with the parts to be welded forming a secondary winding, biasing force means to apply pressure to force the parts toward each other and decrease the spacing between the relatively movable means as the weld progresses, and metallic means capable of conducting magnetic flux mounted on said relatively moving parts to change their relative positions as the parts move and thus change the reluctance of the field of the transformer consisting of the primary and secondary windings as the parts move with respect to each other.

3. In welding apparatus, a toroidal primary winding of a transformer, a hollow housing supporting the same and parts to be welded which form a single turn secondary winding, movable magnetizable yoke means supported adjacent the housing for movement over or away from the same, and means for applying pressure to both the workpieces and to the movable magnetic yoke means to bias the workpieces toward each other as the weld progresses and move the magnetic yokes down over the housing simultaneously.

4. A method of welding two parts together having adjacent surfaces that it is desired to join, the steps of supporting the parts so that the surfaces are in juxtaposition but contoured so as to be spaced at certain areas, arranging the parts so that they, together with the spaced supporting means for each, form a secondary circuit of a welding power transformer and so that they are relatively movable, applying a biasing force to the parts and the supporting means so that the parts will be forced together as the adjacent surfaces are heated and become soft and pliable, applying an alternating current magnetic field to said secondary circuit to induce welding current therein simultaneously with the application of biasing force so that as the adjacent surfaces become molten the parts and supports move toward each other to reduce the reluctance of the magnetic secondary path and increase the electric welding power.

References Cited by the Examiner

UNITED STATES PATENTS

| 2,085,049 | 6/1937 | Spire | 219—97 |
| 2,480,299 | 8/1949 | Klinke | 219—9.5 |

FOREIGN PATENTS 278,208  10/1927  Great Britain.

RICHARD M. WOOD, *Primary Examiner.*